3,692,573
ELECTROCONDUCTIVE AND HEAT BARRIER COATINGS FOR CERAMIC BODIES
Alexander G. Gurwood, 298 NW. 105th St., Miami Shores, Fla. 33153
No Drawing. Continuation-in-part of application Ser. No. 858,871, Sept. 17, 1969. This application Apr. 5, 1971, Ser. No. 131,407
Int. Cl. H01b 1/06; H05b 33/28
U.S. Cl. 117—211  19 Claims

ABSTRACT OF THE DISCLOSURE

This invention is directed to a uniformly electroconductive and heat barrier, stable, transparent coating for large sized pieces of glass or other ceramic bodies, said coating being produced by a composition comprising a monosaccharide hexose sugar, a tin halide, a halide hydracid and a monohydric alcohol having 1 to 3 carbon atoms.

---

This application is a continuation-in-part of pending application Ser. No. 858,871 filed on Sept. 17, 1969, now abandoned in the name of Alexander G. Gurwood, entitled Electro-Conductive Coatings for Ceramic Bodies.

This invention is directed to a novel coating composition for glass and other ceramic bodies and to the articles produced thereby. More specifically, this invention is directed to a uniformly-conductive and heat barrier, stable, transparent coating for glass and the like whereby there is achieved uniform electroconductivity and heat barrier properties in the transparent conductive lattice, which coating is reproducible on a mass-production basis.

In the past, there has been developed the need for electroconductive glass and other ceramic bodies for various applications, such as for example, glass pieces for use in heating devices, aircraft and motor vehicle windshields and other such applications. Generally, in order to render glass or other ceramic bodies electroconductive, it has been necessary to develop suitable compositions which are sprayed onto the surface of the body. The spraying of compositions containing tin compounds of various type and formulations to render the same electroconductive for example, is an old art as exemplified by U.S. Pat. No. 2,118,795 issued on May 24, 1938. Other compositions have been developed containing expensive organic tin compounds, or indium or cadmium salts which are costly, or nitrogen-bearing organic additives, such as phenylhydrazines, or other organic additives such as various ketones and aldehydes, or complex wetting agents, or other metallic salts added to the basic tin compounds. Most of these formulas have enjoyed a degree of success, at least to the extent that the respective formula accomplished the particular end for which it was intended.

More recently, however, there has developed a need for fairly large-size pieces of glass or other ceramic bodies which are electroconductive for use in certain particular applications such as full length, see through, non-fogging refrigerator doors and large clear-vision picture windows for homes and buildings. The difficulty which has been encountered, however, is that these pieces of glass are usually eight or more square feet in area and it has been difficult to coat such pieces, especially on an economical mass-production basis, to produce an electrically-conductive transparent large sheet or plate glass of low resistance and high visible transmission together with consistently reproducible over-all uniformity using currently known methods. The currently available compositions produce "hot and cold" spots on the glass or that is, areas of high and low electrical conductivity whereby good uniformity of coating has been extremely difficult to achieve. Furthermore, various of these coating compositions result in a hazy or tinted appearance whereby the glass develops a brownish or other colored tint, which is not suitable for applications such as for large commercial freezer doors.

Various tin-containing compositions react with hot glass or other like ceramic bodies to deposit a thin, very hard coating which is adherent to the glass, durable and electroconductive. However, it has been found that such compositions containing tin compounds, especially tin halides such as stannic tetrachloride, although usually very electroconductive, tend to produce coatings of poor uniformity and are often characterized by a hazy or cloudy appearance. Other compositions, especially those containing commercially available organotin compounds, while substantially reducing the problem of a hazy or cloudy coating, have been found to produce a brownish or colored tint in the coating, and are economically much more expensive.

A detailed series of tests using prior art formulae of all types on large pieces of glass was conducted. An analysis of various sections cut-out from these large pieces of glass was conducted using an electron-microprobe in high vacuum. It was found that this lack of uniformity of resistance values was due to the presence of either nitrogen, sodium or sulphur ions in the tin oxide conductive lattice or a combination of same. Therefore, it was decided to develop a new formulation totally devoid of all sodium, nitrogen or sulphur ions as used in the prior art, deriving from such materials used in the prior art as phenylhydrazine hydrochlorides, sodium dioctyl sulphosuccinate, and ammonium bifluoride.

It is therefore one object of this invention to provide a novel composition for coating large-size glass or other ceramic bodies to render the same electroconductive whereby more uniform coatings are achieved having over-all resistance values more evenly distributed than presently obtainable.

In connection with the aforementioned object, it is another object of this invention to provide a composition for coating glass or other ceramic bodies which will result in uniform electroconductive coatings on a mass-production basis.

It is still another object of this invention to provide coatings for ceramic bodies having more uniform over-all low-resistance and high conductivity in one heat and spray cycle thereby lowering manufacturing costs while at the same time preventing excessive warping and bending of the larger pieces of ceramic bodies caused by repeated heating and cooling cycles.

Yet another object of this invention is to provide coatings of the type described for large size pieces of ceramic bodies by performing the coating operation at sufficiently low surface temperatures so as to ensure minimum deformation and distortion of the body.

A further object of this invention is to provide coatings for large size pieces of ceramic bodies having uniform resistance values on the order of 20 ohms per square or less in one heat and spray production cycle.

In connection with the foregoing objects, it is another object to provide coatings of the type described for large size pieces of ceramic bodies having a total visible light transmission greater than 70%.

Still another object of this invention is to provide coatings of the type set forth for large size pieces of ceramic bodies which eliminate the use of expensive indium or cadmium salts in the formulation, and which further eliminate the nitrogen sulphur or sodium bearing compounds from the formulation.

Still another object of this invention is to provide a composition for coating glass or other ceramic bodies including a monosaccharide hexose sugar, a tin halide, a halide hydracid and a monohydric alcohol having from 1 to 3 carbon atoms whereby the ceramic body is rendered electroconductive.

In connection with the foregoing object, it is yet a further object of this invention to provide a composition for coating glass or other ceramic bodies including d-glucose, tin tetrachloride, hydrofluoric acid and methanol.

Another object of this invention is to provide an article of manufacture including a ceramic body, such as glass, having a uniformly distributed electroconductive coating adherently disposed upon the surface thereof, the coating including a monosaccharide hexose sugar, a tin halide, a halide hydracid and a monohydric alcohol having from 1 to 3 carbon atoms.

In addition to the foregoing objects, it is another object of this invention to provide coatings of the type set forth above which may be used without electricity as a heat barrier or filter for certain applications within a defined temperature range.

In connection with the foregoing object, it is another object of this invention to provide coatings for glass or other ceramic bodies which will function as a heat barrier for reflecting long-wave infra red heat in the temperature range of from 300° F. to about 550° F.

Yet another object of this invention is to provide a novel improved method for the production of transparent coatings for ceramic bodies, such as glass and the like, comprising heating the ceramic body to a temperature of at least 600° F. and applying to the ceramic body while in the heated condition a composition comprising a monosaccharide hexose sugar, a tin halide, a halide hydracid and a monohydric alcohol having 1 to 3 carbon atoms, whereby the resultant coating is devoid of any nitrogen, sodium and sulphur atoms, thereby to produce coatings of more uniform over-all resistance, which are electroconductive and additionally, exhibit heat barrier characteristics.

Other objects and advantages inherent in this invention will be better understood by reference to the accompanying description and examples which are presented hereinbelow.

DETAILED DESCRIPTION OF THE INVENTION

In order to render a ceramic body, such as glass, electroconductive, it is necessary to coat or film the body with a composition which produces an electroconductive lattice. Generally, these compositions include a tin or cadmium or indium compound, tin compounds being the preferred from an economical and efficiency standpoint. The exact chemical reaction which occurs between the hot glass or ceramic body surface and the tin compound during the coating or filming operation is still not exactly understood even though this art has been known and practiced for many years. One theory is that glass is an amorphous substance and behaves like a liquid, a supercooled liquid. If the glass is brought to a high enough temperature, it becomes fluid enough to allow certain other atoms to diffuse slightly into its surface, changing the electron structure of the surface and sub-surface. This new energy level of the glass due to the foreign atoms now becomes a conductor of electricity.

The generally accepted theory by glass technologists is that the tin oxide film adheres to the glass surface by a type of bridge-bonding mechanism between the unsatisfied hydroxyl groups present on the glass surface. Hence, the amount of tin incorporated into the glass is relatively small compared to that adhered to the surface by the development of the tin-oxide lattice film thereon.

In any event, these thin films containing tin compounds do have an electrical conductivity several million times greater than the ceramic body on which they are applied. The tin oxide lattice film generally has an electrical resistance less than one millionth that of the glass or ceramic body, and can vary in thickness between 30 and 950 millimicrons, and normally appears iridescent by reflected light. The coating composition of the present invention similarly utilizes tin compounds, more specifically, tin halides but further includes various other components which result in a more uniform over-all coating especially in connection with very large pieces or areas of such ceramic bodies. Furthermore, the coating compositions of the present invention result in a highly transparent coating without any brownish or other colored tint therein, and without any excessive hazy or cloudy appearance. In addition, such coatings exhibit good heat barrier characteristics, especially in the temperature range of from about 300° F. to about 550° F. Hence, the coatings of the present invention are useful as heat barrier coatings such as for commercial oven window glass, or the like where the normal surface temperature of the outer glass reaches a hazardous level.

Gnerally, the coating composition of this invention consists of a tin oxide complex formed by applying to the hot ceramic body a solution comprising a monosaccharide hexose sugar, a tin halide and a halide hydracid to which is added a simply monohydric alcohol having from 1 to 3 carbon atoms.

Various monosaccharide sugars may be utilized in this composition. For example, dextrose, mannose, sorbose and other hexose sugars may be used. The preferred hexose sugar is common hydrous dextrose, $C_6H_{12} \cdot H_2O$, or powdered anhydrous dextrose (D-glucose), both of which are commercially available at low cost. An even more economical source for the required simple hexose sugar is to manufacture it from ordinary saccharose or cane sugar by utilizing the high heat of solution of anhydrous tin tetrachloride ($SnCl_4$) and hydrochloric acid liberated when the anhydrous tin tetrachloride is added to the water in making the new complex. If the cane sugar is dissolved in the water prior to adding the anhydrous $SnCl_4$; the heat generated quickly causes the sugar to hydrolize in the presence of hydrochloric acid to form glucose and levulose according to the following formula:

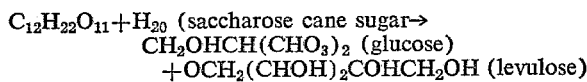

The tin halide may be tin chloride, e.g. stannous chloride or tin tetrachloride, or tin fluoride among other such tin halides. The preferred compound is stannic tetrachloride, especially in the anhydrous form because of its low cost and more uniform analysis thereby minimizing the chances for contamination. In connection with the elimination of sources for contamination, it is also important that the distilled water which is utilized be free of excessive dissolved gases since these gases do present a real source of contamination.

The monohydric alcohol functions as a stabilizer for the sugar-tin halide complex as well as serving as a glass wetting agent. Monohydric alcohols useful in the composition include methanol, ethanol (plain or denatured), or isopropyl alcohol. Methanol is the preferred alcohol since it is water-miscible, acts as a good glass wetting agent and is a good stabilizer for the new sugar-tin-halogen complex. It has the further advantage of containing only one carbon atom, thus preventing the possibility of supplying undesired excess carbon atoms to the tin-oxide lattice with a resulting lowering of the conductivity rating of the coating. Ethyl alcohol (plain or denatured) or isopropyl alcohol may be used but lesser quantities must be used since these alcohols have more carbon atoms. As a result, there is a lowering of the degree of sulface wetting obtained as compared to the full quotient of methanol.

The monosaccharide sugar in the complex reacts with the free hydrochloric acid present, due to the presence of $SnCl_4$ and $H_2O$, to form levulinic acid

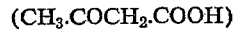

When a hydracid, such as hydrofluoric acid is added to this sugar-tin-acid solution, heat is evolved, the solution slowly changes color and the pH is lowered when the end point is reached. Three known complexes are possible as a result of this reaction; a fluoglucosic acid analogous to fluosaccharic acid plus stannous chlorofluoride, or a hexafluorostannite, or hexafluorostannate.

Regardless of the exact chemical composition of the product complex, when applied to a ceramic body as a coating, it produces the desired high degree of electrical-resistance uniformity on the entire surface of the coated piece regardless of size, and also displays heat barrier characteristics, as will be more fully described hereinbelow.

The following examples are presented in order to illustrate some embodiments of the present invention and are not intended to limit the scope of this invention thereby.

Examples 1 through 3 illustrate three of the possible compositions of the coating of the present invention in terms of ingredients and amounts.

EXAMPLE 1

| Compound: | Volume-weight |
|---|---|
| Stannic chloride pentahydrate ($SnCl_4 \cdot 5H_2O$) _____ grams__ | 630 |
| Distilled water _____ ml__ | 24 |
| Sugar syrup (70% hexose sugar, 30% $H_2O$) _____ grams__ | 17 |
| Hydrofluoric acid (70%) _____ ml__ | 19 |
| Ethanol (#3A denatured) _____ ml__ | 42 |

EXAMPLE 2

| Compound: | Volume-weight |
|---|---|
| Distilled water _____ ml__ | 1165 |
| Anhydrous stannic tetrachloride _____ ml__ | 1350 |
| Cane sugar (granulated surcrose) ___ grams__ | 37 |
| Hydrochloric acid (10%) _____ ml__ | 80 |
| Ethanol (#30 denatured) _____ ml__ | 260 |

In Example 2, the distilled water and anhydrous stannic tetrachloride are first mixed together. Then, during the heat of reaction, the 37 grams of granulated sucrose is added, followed by addition of the 10% solution of hydrochloric acid. When the solution turns a deep straw color, the inversion is completed and the alcohol is then added to complete the composition.

EXAMPLE 3

| Compound: | Volume-weight |
|---|---|
| Anhydrous $SnCl_4$ _____ ml__ | 900 |
| Distilled water _____ ml__ | 750 |
| Anhydrous dextrose (α-d-glucose) ___ grams__ | 25 |
| Methanol _____ ml__ | 275 |
| Hydrofluoric acid (70%) _____ ml__ | 58 |

Compositions formed in accordance with any of Examples 1 to 3 have been successfully formed by substituting either mannose or sorbose as the hexose sugar and by substituting isopropyl alcohol as the monohydric alcohol. Compositions formed with these alternative compounds have shown similarly good results in terms of the objects and advantages of this invention when such compositions are utilized to film or coat a ceramic body.

The following examples, Examples 4 to 6, are presented in order to illustrate the manner in which the formulation of Examples 1 through 3 are utilized in order to coat a ceramic body to provide a coating or film thereon in accordance with the objects of the present invention.

EXAMPLE 4

A sheet of ordinary double-strength window glass, ⅛ inch thick and 22 inches by 18 inches in size was first washed with a mild detergent and warm tap water, then rinsed in clean water, and finally placed to soak in a 1% solution of U.S.P. lactic acid which is first heated to 170° F. The glass was allowed to soak for about 3 minutes and then removed and rinsed with distilled water and placed in a V-groove drainage rack to dry. This pretreatment step removes any free alkali and/or alkali-metal oxides from the glass surface to be coated.

The composition of the window glass is as follows:

| | Percent by weight |
|---|---|
| $SiO_2$ | 71.21 |
| $Na_2O$ | 12.83 |
| $CaO$ | 9.81 |
| $MgO$ | 4.36 |
| $Na_2So_4$ | 0.72 |
| $NaCl$ | 0.11 |
| $Al_2O_3$ | 0.80 |
| $Fe_2O_3$ | 0.16 |

The sheet of glass was then hung on tongs on its short edge and placed in an electrically heated vertical glass furnace in which the temperature was evenly maintained at 1200° F. After about 2 minutes, the sheet of glass was removed on a monorail from which the tongs are suspended and placed in a spray booth adjacent the heating furnace.

The hot glass was then sprayed for a period of about 13 seconds with a composition formed in accordance with Example 2.

The spraying of the hot glass was carried out at a room temperature of 76° F. with a relative humidity of approximately 40%. The spraying air was held at 30 p.s.i. and was kept oil-free and filtered through aftercoolers and paper-wadded filters to remove dirt and excess moisture before delivery to the atomizing heads spraying the above solution. The atomizing heads were arranged so that the entire sheet of glass was blanketed with the spray solution at the same time.

After cooling, the coated sheet was placed over a piece of white cardboard ruled off into 1½ inch squares. The central area of each individual square was measured for resistance-value in ohms per square, a standard method of measuring electroconductive glass. The lowest reading in any squared area was 84 ohms and the highest individual zone reading was 89 ohms. This type of glass and the uniformity of the coating in resistance-value would be suitable for use in assembling into a double-glazed 110 v. refrigerator door with the electrodes disposed parallel to the long edges of the glass.

EXAMPLE 5

A piece of ³⁄₁₆ inch thick window glass having the same composition as the glass in Example 4 was pretreated in the same manner as described in Example 4. The glass size was 24 inches x 28 inches. The glass was hung on tongs, so that the short edge (24 inches) was horizontal. The furnace temperature was evenly maintained throughout at 1160° F. The glass was held in the furnace for 3 minutes and 25 seconds and quickly transported to the spray booth it was immediately sprayed with the composition described in Example 1 for a total time of 18 seconds in 3 second intervals (6 bursts) with a 1 second interval between each 3 second spray cycle, a total time of 23 seconds. This was to allow the fumes produced to be purged from the glass surface by the exhaust fans between bursts of the coating-solution spray. The entire surface of the glass was blanketed simultaneously by the atomized solution which was applied using 40 p.s.i. of the clean dry air.

When cool the coated glass was placed over the ruled carboard as in Example 4 and the resistance values read in each of the 1½ inch square areas. The lowest reading obtained on this 24 inch x 28 inch glass was 37 ohms per square and the highest reading in any 1½ inch square area with 41 ohms per square. This uniformity of resistance-value and type of glass would be suitable for assembling into a double-glazed window for architectural use.

To test this glass panel for surface-temperature uniformity two electrodes were applied along the two short edges of the glass. First two soldering leads of .005 thick copper cut to ¼ inch x 1½ inch in size were fastened to two corners on the 24 inch side of the glass using a conductive epoxy silver solder to weld the copper strips to the coated glass surface. The weld was cured using two infra-red heating lamps, one on each corner for one hour. After the glass was cooled to room temperature a one-quarter inch wide strip of silver conductive coating (epoxy) was brushed along the two short edges using peel-off masking tape as a masking device. This was baked for one hour at approximately 250° F. After cooling, two electrical leads were fastened to the copper strips attached to the bus-bars as above and the wires connected to a 110 v. A.C. outlet. After 20 minutes the glass surface was checked with a surface-reading thermometer in every area of the heating panel. The temperature was read on the opposite side of the coated glass (room side) and the lowest reading on the surface-reading thermometer in any area was 115° F. and the highest temperature in any area was 122° F. This is acceptable uniformity for such an end use.

EXAMPLE 6

A plate of one-quarter inch thick tinted automotive plate glass 14 inches x 28 inches in sizes, was prepared and pretreated as outlined in Example 4. This glass has the following composition:

|  | Percent by weight |
| --- | --- |
| $SiO_2$ | 71.44 |
| $Na_2O$ | 12.65 |
| $K_2O$ | 0.46 |
| $CaO$ | 11.65 |
| $MgO$ | 2.42 |
| $Na_2SO_4$ | 0.46 |
| $NaCl$ | 0.14 |
| $Al_2O_3$ | 0.20 |
| $Fe_2O_3$ | 0.58 |

The glass was hung and placed in the electric furnace with its 14 inch dimension horizontally disposed. The furnace was maintained at 1150° F. The plate glass was kept in the furnace for about 4 minutes then quickly transported into the spray booth. The glass was blanket-sprayed with the composition described in Example 3 for a total time period of 24 seconds in a series of eight 3 second spray intervals separated by a 1 second interval for removal of spray fog and fumes and to allow the cooled surface being sprayed to become re-heated. The total elapsed time of the combined spray-exhaust cycle was 31 seconds, the spraying composition being atomized at a pressure of 40 p.s.i.

When the glass cooled it was placed over the ruled cardboard and each 1½ inch x 1½ inch area checked for resistance rating. This glass proved to be extremely uniform over its whole area—the lowest reading being 9½ ohms per square and the highest reading being 11 ohms per square. The lower resistance readings as compared to Examples 4 and 5 were due mainly to the increased spraying time although the heat mass retained in the thicker glass and the more concentrated spray solution were contributing factors.

This type of glass with its low resistance and extreme uniformity of all-over resistance-values has possibilities for use in automatic glazing, especially as a self-defrosting rear window.

As has been indicated hereinabove, while the coatings described of the present invention exhibit excellent electro-conductive properties uniformly throughout coated ceramic bodies, these coatings also exhibit very good heat barrier properties. For example, it is known that while plain tin oxide coatings on a ceramic body such as glass, exhibit some heat-blocking effects in the lower temperature range, i.e. the so-called "black heat" range of about 175° F. such coatings are relatively inefficient in blocking "black heat" radiation above this temperature unless combined with some other metal oxide such as cobalt, iron, nickel or the like.

Following below are various examples illustrative of the heat barrier properties of prior plain tin oxide coatings compared with the heat barrier coatings of the present invention.

A commercial kitchen gas range equipped with a standard double-glazed window 10 inch x 18 inches comprising two pieces of 3/16 inch thick window glass with a ½ inch air space was used to determine the ability of the coating composition in this invention to attenuate heat rays in the temperature range of 350° to 450° F. the normal cooking temperature range for common cooking. The oven was set at 400° F. and an additional oven thermometer was placed in the oven, which could be viewed through the viewing window of the oven door, as described above. After one hour of operation, the surface temperature of the outer glass of the oven window was measured using a surface-reading probe thermometer. The average temperature of the glass surface was 190° F.

EXAMPLE 7

Two pieces of glass having a 3/16 inch thickness and of the proper size were heated to 1220° F. in a furnace as described in Examples 4–6 above, for a period of four minutes. Each was then sprayed for a 15 second interval with a tin solution as recommended in the prior art (see, for example, U.S. Pat. No. 2,564,708) to produce a long wavelength infra-red reflective coating. The coating composition consisted of the following ingredients:

100 grams $SnCl_4 \cdot 5H_2O$ (stannic chloride pentahydrate)
50 cc. $H_2O$ distilled
10 cc. Concentrated HCI These two coated glasses were then placed in the oven door assembly with the two coated surfaces facing toward the oven interior replacing the two pieces of uncoated glass normally supplied with the oven. The heating cycle of the kitchen oven was then repeated as described above. The final temperature readings of the outer glass surface average 178° F. or a temperature reduction of 12° F. over the uncoated pair of glass windows.

EXAMPLE 8

Two pieces of glass having a 3/16 inch thickness and of the proper size were placed in the furnace as previously described again at 1200° F. for a 4 minute period and then each was sprayed for a 15 second interval with the coating composition as described above in Example No. 3.

These two pieces of glass coated on one side with the composition of Example 3 were then placed in the kitchen range with the coated surfaces facing toward the oven interior. After a one hour heating cycle at 400° F. as previously outlined, the surface temperature of the outer glass measured an average of 164° F. representing a reduction of 26° F. over the original uncoated glass windows used in the double-glazed window assembly of the kitchen stove; and, 14° F. lower than the temperature achieved in Example 7 above.

Similarly good results are obtained when coating compositions of the formulation set forth in Examples 1 and 2 above, or the other formulations taught hereinabove, are utilized for coating ceramic bodies. Such coatings show improved heat barrier or heat reflective characteristics over the plain tin coatings shown and described in the prior art, at least with respect to long-wave infra-red heat in the temperature range of from about 300° F. to about 550° F. Hence, such coatings would have the commercial potential for use as coatings on oven window glass or the like to reduce the hazard of burns to children or others who might touch or press against an oven while the same is in operation, especially where such oven glass doors are associated with a lower oven chamber.

From the foregoing description, it is clear that the compositions described herein achieve all of the objects and advantages set forth. The coating compositions described herein when applied to ceramic bodies, such as glass, result in a superior electroconductive coating which has more uniform resistance values over the entire surface area of the coated body, which is primarily due to the elimination of all nitrogen, sodium and sulphur bearing compounds from the formulation. Furthermore, these coating compositions may be utilized to coat large-size pieces of glass or other ceramic bodies uniformly and on a mass-production basis with a low percentage of rejects, and at an economical cost.

While there has been described what is at present considered to be the preferred embodiments of the invention, it will be understood that various modifications may be made therein and it is intended to cover in the appended claims all such modifications as fall within the true spirit and scope of the invention.

What I claim is:

1. A composition suitable for application to a ceramic body for rendering the ceramic body electroconductive, comprising a monosaccharide hexose sugar, a tin halide, a halide hydracid and a monhydric alcohol having 1–3 carbon atoms.

2. A composition as set forth in claim 1, wherein said monosaccharide hexose sugar comprises a member selected from the group consisting of glucose, mannose and sorbose.

3. A composition as set forth in claim 2, wherein said monosuccharide hexose sugar comprises d-glucose.

4. A composition as set forth in claim 1, wherein said tin halide comprises tin chloride.

5. A composition as set forth in claim 4, wherein the tin halide comprises stannic tetrachloride.

6. A composition as set forth in claim 1, wherein said halide hydracid comprises hydrofluoric acid.

7. A composition as set forth in claim 1, wherein said halide hydracid comprises hydrochloric acid.

8. A composition as set forth in claim 2, wherein said monohydric alcohol comprises a member selected from the group consisting of methanol, ethanol and isopropyl alcohol.

9. A composition as set forth in claim 8, wherein said monohydric alcohol comprises methanol.

10. An article of manufacture comprising a ceramic body having a uniformly distributed electroconductive coating adherently disposed upon the surface thereof, said coating formed from a composition comprising a monosaccharide hexose sugar, a tin halide, a halide hydracid and a monohydric alcohol having 1–3 carbon atoms.

11. An article of manufacture as set forth in claim 10, wherein said ceramic body comprises a sheet of glass.

12. An article of manufacture as set forth in claim 11, wherein said monosaccharide hexose sugar comprises d-glucose, said tin halide comprises tin tetrachloride, said halide hydracid comprises hydrofluoric acid an said monohydric alcohol comprises methanol.

13. An improved method for the production of a transparent electroconductive coating for ceramic bodies, such as glass and the like, comprising heating the ceramic body to a temperature of at least 600° F. and applying to the ceramic body while in the heated condition a composition comprising a monosaccharide hexose sugar, a tin halide, a halide hydracid and a monohydric alcohol having 1 to 3 carbon atoms, whereby the resultant coating is devoid of any nitrogen, sodium and sulphur atoms, thereby to produce electroconductive coatings of more uniform over-all resistance.

14. The method as set forth in claim 13, wherein said composition comprises d-glucose, tin tetrachloride, hydrofluoric acid and methanol.

15. An article of manufacture comprising a ceramic body having a uniformly distributed heat-barrier coating adherently disposed upon the surface thereof, said coating formed from a composition comprising a monosaccharide hexose sugar, a tin halide, a halide hydracid and a monohydric alcohol having 1–3 carbon atoms, whereby said ceramic body having said coating disposed thereon substantially improves the heat barrier characteristics of said coated ceramic body with respect to longwave infrared heat in the temperature range of from about 300° F. to about 550° F.

16. An article of manufacture as set forth in claim 15, wherein said ceramic body comprises a sheet of glass.

17. An article of manufacture as set forth in claim 16, wherein said monosaccharide hexose sugar consists of d-glucose said tin halide comprises tin tetrachloride, said halide hydracid comprises hydrofluoric acid and said monohydric alcohol comprises methanol.

18. A method for improving the barrier characteristics of a ceramic body within the temperature range of from about 300° F. to about 550° F., comprising the steps of providing a ceramic body, heating said ceramic body to a temperature of at least 600° F., and applying to said ceramic body while in the heated condition a composition comprising a monosaccharide hexose sugar, a tin halide, a halide hydracid and a monohydric alcohol having 1 to 3 carbon atoms, whereby the resultant coating is devoid of any nitrogen, sodium and sulphur atoms, thereby to provide the uniformly appearing coating on said ceramic body thereby to increase the heat reflective characteristics of said ceramic body when exposed to long-wave infra-red heat in the temperature range of between about 300° F. to about 550° F.

19. The method as set forth in claim 18, wherein said composition comprises d-glucose, tin tetrachloride, hydrofluoric acid and methanol.

References Cited

UNITED STATES PATENTS

| | | | |
|---|---|---|---|
| 3,544,361 | 12/1970 | Servias | 117—211 |
| 3,498,825 | 3/1970 | Wiens | 117—54 |
| 3,252,829 | 5/1966 | Romstadt | 117—211 |
| 3,005,731 | 10/1961 | Payne | 117—211 |

RALPH S. KENDALL, Primary Examiner

M. F. ESPOSITO, Assistant Examiner

U.S. Cl. X.R.

106—162; 117—54, 123 B, 123 C, 124 B, 124 D, 229; 252—518